United States Patent
Guillotel et al.

(10) Patent No.: US 11,964,200 B2
(45) Date of Patent: Apr. 23, 2024

(54) METHOD AND APPARATUS FOR PROVIDING HAPTIC FEEDBACK AND INTERACTIVITY BASED ON USER HAPTIC SPACE (HAPSPACE)

(71) Applicant: INTERDIGITAL CE PATENT HOLDINGS, Paris (FR)

(72) Inventors: Philippe Guillotel, Vern sur Seiche (FR); Fabien Danieau, Rennes (FR); Julien Fleureau, Rennes (FR); Didier Doyen, La bouexiere (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 339 days.

(21) Appl. No.: 15/742,722

(22) PCT Filed: Jul. 7, 2016

(86) PCT No.: PCT/EP2016/066157
§ 371 (c)(1),
(2) Date: Jan. 8, 2018

(87) PCT Pub. No.: WO2017/009181
PCT Pub. Date: Jan. 19, 2017

(65) Prior Publication Data
US 2018/0200619 A1 Jul. 19, 2018

(30) Foreign Application Priority Data
Jul. 13, 2015 (EP) .................................. 15306156

(51) Int. Cl.
*A63F 13/285* (2014.01)
*A63F 13/28* (2014.01)
*G06F 3/01* (2006.01)

(52) U.S. Cl.
CPC ............ *A63F 13/285* (2014.09); *A63F 13/28* (2014.09); *G06F 3/011* (2013.01); *G06F 3/016* (2013.01)

(58) Field of Classification Search
CPC ........ A63F 13/285; A63F 13/28; G06F 3/011; G06F 3/016; G06T 19/006
See application file for complete search history.

(56) References Cited

U.S. PATENT DOCUMENTS

| 3,983,640 A | 10/1976 | Cardullo et al. |
| 7,646,394 B1 * | 1/2010 | Neely, III ............... G06F 3/011 715/863 |

(Continued)

FOREIGN PATENT DOCUMENTS

| CN | 101059717 A | 10/2007 |
| CN | 103543830 A | 1/2014 |

(Continued)

OTHER PUBLICATIONS

Kim et al., "Construction of a haptic-enabled broadcasting system based on the MPEG-V standard", Signal Processing: Image Communication, vol. 28, No. 2, Nov. 6, 2012, pp. 151-161.

(Continued)

*Primary Examiner* — James S. McClellan
*Assistant Examiner* — Ross A Williams
(74) *Attorney, Agent, or Firm* — Jerome G Schaefer

(57) ABSTRACT

In a particular implementation, a user environment space for haptic feedback and interactivity (HapSpace) is proposed. In one embodiment, the HapSpace is a virtual space attached to the user and is defined by the maximum distance that the user's body can reach. The HapSpace may move as the user moves. Haptic objects and haptic devices, and the associated haptic properties, may also be defined within the HapSpace. New descriptors, such as those enable precise locations and (Continued)

link between the user and haptic objects/devices are defined for describing the HapSpace.

22 Claims, 10 Drawing Sheets

(56) References Cited

U.S. PATENT DOCUMENTS

| | | | |
|---|---|---|---|
| 7,990,374 B2 | 8/2011 | Itkowitz et al. | |
| 8,532,675 B1* | 9/2013 | Pasquero | H04M 1/72457 |
| | | | 455/418 |
| 9,208,530 B2 | 12/2015 | Kuroki et al. | |
| 9,230,368 B2* | 1/2016 | Keane | G06F 3/04815 |
| 9,478,067 B1* | 10/2016 | Worley, III | G06F 3/016 |
| 9,480,907 B2* | 11/2016 | Benko | A63F 13/00 |
| 2010/0302015 A1 | 12/2010 | Kipman et al. | |
| 2011/0193939 A1 | 8/2011 | Vassigh et al. | |
| 2013/0050062 A1 | 2/2013 | Kim et al. | |
| 2013/0208899 A1 | 8/2013 | Vincent et al. | |
| 2014/0347176 A1* | 11/2014 | Modarres | G06F 3/016 |
| | | | 340/407.1 |

FOREIGN PATENT DOCUMENTS

| | | |
|---|---|---|
| JP | 2002125999 A | 5/2002 |
| JP | 2013524351 A | 6/2013 |
| JP | 5502348 B2 | 5/2014 |
| KR | 20140001167 A | 1/2014 |
| RU | 2407072 C1 | 12/2010 |
| WO | WO2009136345 | 11/2009 |
| WO | WO 2014190106 A1 | 11/2014 |
| WO | WO 2015095754 A1 | 6/2015 |

OTHER PUBLICATIONS

Yu et al., "MPEG-V Based Web Haptic Authoring Tool", 2013 IEEE International Symposium on Haptic Audio Visual Environments and Games (HAVE), Istanbul, Turkey, Oct. 26, 2013, pp. 87-91.

* cited by examiner

METHOD AND APPARATUS FOR PROVIDING HAPTIC FEEDBACK AND INTERACTIVITY BASED ON USER HAPTIC SPACE (HAPSPACE)

CROSS REFERENCE TO RELATED APPLICATIONS

This application is a National Stage Application under 35 U.S.C. § 371 of International Application PCT/EP2016/066157, filed Jul. 7, 2016, which claims the benefit of European Patent Application No. 15306156.9 filed Jul. 13, 2015.

TECHNICAL FIELD

This invention relates to a method and an apparatus for providing haptic feedback and interactivity, and more particularly, to a method and an apparatus for providing haptic feedback and interactivity based on a user haptic space.

BACKGROUND

New technology developments allow the creation of more and more immersive multimedia systems. 3D images and sound spatialization are now present in an user's living space. These systems are usually related to the stimulation of two senses, namely, sight and hearing. In addition, researches in virtual reality have shown that haptic perception seems to be strongly connected to immersion feeling, which leads to the definition of a new scientific field, the HAV (haptic-audiovisual) field that considers both haptic perception and audiovisual (A/V) content.

SUMMARY

According to an aspect of the present principles, a method for transmitting haptic effects is presented, comprising: defining a space that includes at least one haptic object that is accessible to a user; specifying haptic properties associated with the at least one haptic object; encoding the haptic properties associated with the at least one haptic object into a bitstream; and transmitting the bitstream via a communication interface. The present embodiments also provide an apparatus for performing these steps.

According to another aspect of the present principles, a method for providing haptic feedback is presented, comprising: defining a space that includes at least one haptic object that is accessible to a user; decoding haptic properties associated with the at least one haptic object from a bitstream; and providing haptic feedback to the user responsive to the decoded haptic properties associated with the at least one haptic object. The present embodiments also provide an apparatus for performing these steps.

According to another aspect of the present principles, a signal is formatted to include: a space that includes at least one haptic object that is accessible to a user; a position in the space where the user receives a haptic effect, the position being specified by three Cartesian coordinates; and haptic properties associated with the at least one haptic object.

The present embodiments also provide a computer readable storage medium having stored thereon instructions for transmitting or providing haptic effects according to the methods described above.

The present embodiments also provide a computer readable storage medium having stored thereon a bitstream generated according to the methods described above.

According to an aspect of the present principles, a method of transmitting a bitstream comprising data representative of haptic effect, the method comprising: encoding, into said bitstream, a first descriptor representative of a location of origin of a space; encoding, into said bitstream, a second descriptor representative of a location of a virtual object having associated haptic properties with regard to said space; transmitting said bitstream.

According to an embodiment, the method further comprises encoding, into said bitstream, a third descriptor representative of a location of a haptic device with regard to said space.

According to an aspect of the present principles, a method of decoding information representative of a haptic effect, the method comprising: receiving a bitstream; decoding from said bitstream a first descriptor representative of a location of origin of a space; decoding from said bitstream a second descriptor representative of a location of a virtual object having associated haptic properties with regard to said space.

According to an embodiment, the method further comprises decoding from said bitstream, a third descriptor representative of a location of a haptic device with regard to said space.

According to an aspect of the present principles, a device configured to transmit a bitstream comprising data representative of haptic effect, the device comprising: an encoder configured to encode, into said bitstream, a first descriptor representative of a location of origin of a space and encode, into said bitstream, a second descriptor representative of a location of a virtual object having associated haptic properties with regard to said space; and a transmitter transmitting said bitstream.

According to an aspect of the present principles, a device configured to transmit a bitstream comprising data representative of haptic effect, the device comprising: means for encoding, into said bitstream, a first descriptor representative of a location of origin of a space; means for encoding, into said bitstream, a second descriptor representative of a location of a virtual object having associated haptic properties with regard to said space; and means for transmitting said bitstream.

According to an aspect of the present principles, a device configured to decode information representative of haptic effect, the device comprising: a receiver receiving a bitstream; a decoder configured to decode, from said bitstream, a first descriptor representative of a location of origin of a space and decode, from said bitstream, a second descriptor representative of a location of a virtual object having associated haptic properties with regard to said space.

According to an aspect of the present principles, a device configured to decode information representative of haptic effect, the device comprising: means for receiving a bitstream; means for decoding, from said bitstream, a first descriptor representative of a location of origin of a space; and means for decoding, from said bitstream, a second descriptor representative of a location of a virtual object having associated haptic properties with regard to said space.

According to an aspect of the present principles, a signal carrying at least a packet comprising data representative of an haptic effect, wherein the signal further carries a first descriptor representative of a location of origin of a space and a second descriptor representative of a location of a virtual object having associated haptic properties with regard to said space.

According to an aspect of the present principles, a non-transitory processor readable medium having stored therein instructions for causing a processor to perform at least the steps of the transmitting method.

According to an aspect of the present principles, a non-transitory processor readable medium having stored therein instructions for causing a processor to perform at least the steps of the decoding method.

DETAILED DESCRIPTION

Figure 1:
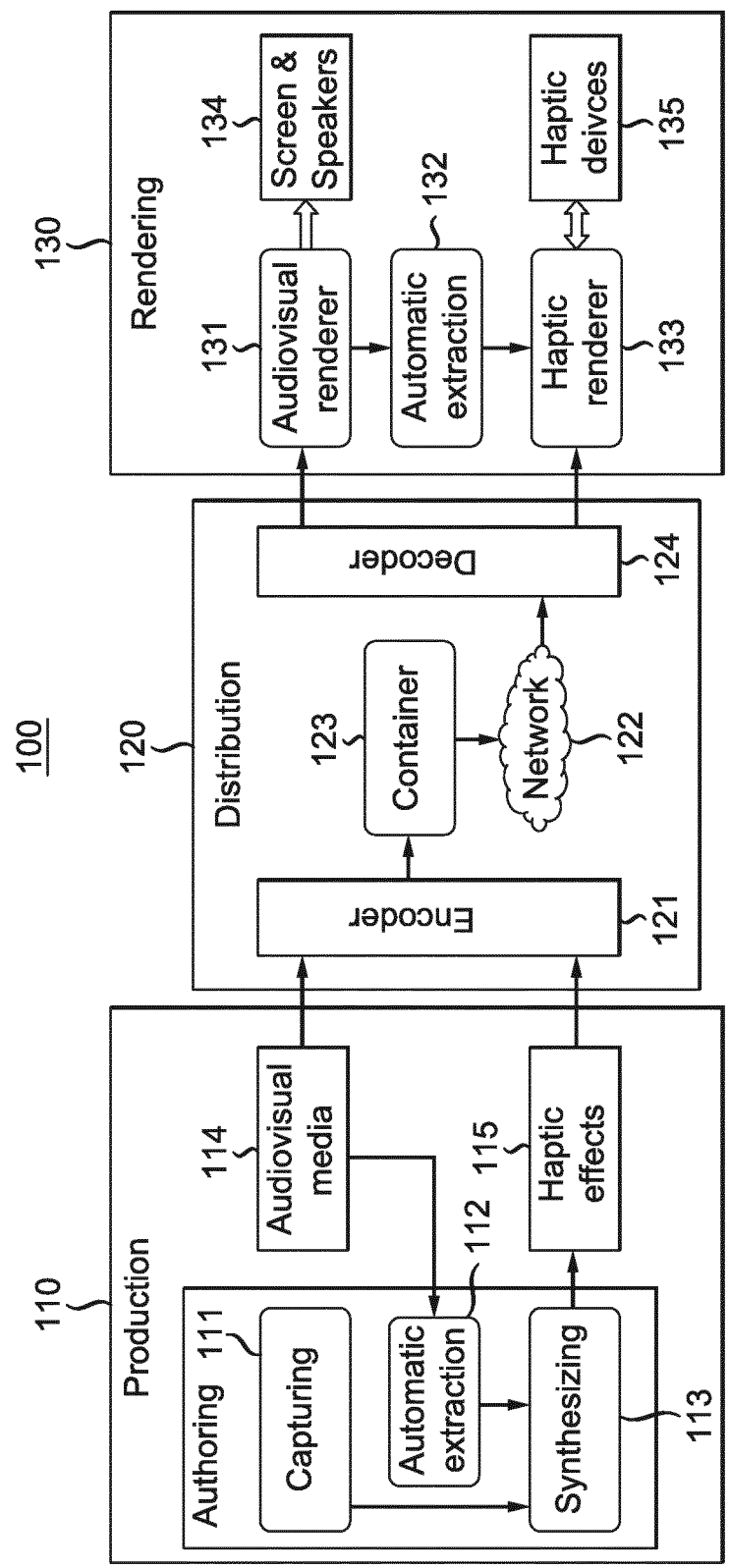
FIG. 1 illustrates the workflow of an exemplary HAV system.

FIG. 1 illustrates the workflow of an exemplary HAV system 100 that provides both haptic effects and audiovisual effects, which includes three main parts: production (110), rendering (130) and distribution (120).

Production/Creation of Haptic Data (110)

The production of the content, i.e., creation and generation of haptic effects in synchronization with the audiovisual content, can be done using different techniques. For example, as shown in FIG. 1, haptic effect production can be performed by:
- capture and processing (111) data acquired from sensors (for example, inertial motion units, GPS),
- automatic extraction (112) from one or more component of the audiovisual media (114, for example, from image, audio or annotations), and/or
- manual authoring (113) of haptic effects, for example, using a graphical user interface (GUI).

The selection of a production method depends on both the application and the creative intent. Note that when the haptic effects (115) are generated using data acquired from sensors (111) or using automatic extraction from audiovisual media (113), the production generally still goes through an authoring tool (113) to synthesize the haptic effects.

There are different types of haptic perceptual capabilities, for example, but not limited to, tactile, kinesthetic and proprioception, and the haptic effects to be created can be classified into: temperature, vibration, pressure, movement, force and body motion, as exemplified in Table 1. In the present application, we use the terms "haptic effect" and "haptic feedback" interchangeably.

TABLE 1

| Haptic Perception | Haptic Effect |
|---|---|
| Tactile | Temperature |
|  | Vibration |
|  | Pressure |
| Kinesthetic | Movement |
|  | Force |
| Proprioception | Body Motion |

Rendering Haptic Feedback (130)

Most existing works in providing haptic feedback along with audiovisual content rely on the use of vibrotactile devices, which may be standalone devices or be integrated into a chair or force-feedback device. Most of the vibrotactile seats convert low-frequency sound into vibrations. Like subwoofers, this type of seats is plugged on the low-frequency audio channel but delivers vibrations instead of actual sound. This type of seats may vibrate entirely, or have several vibrations motors embedded. In a recently developed vibrotactile chair, an array of 12 vibrotactile actuators are embedded in the back of the chair, and the user's sensation is controlled through tactile illusions which make the user feel a continuous stimulus while actuators are at discrete locations. In general, the haptic effects provided by the vibrotactile devices are relatively simple, which usually provide artificial vibrations patterns or abstract force-feedback.

Rendering motion is usually more complicated than rendering vibration as discussed above. Motion simulators are well-known devices designed to make the user feel motion. They are intensively used in driving or flight simulators for learning purposes or in amusement parks. Most of them are based on the Stewart's platform, which is a six Degrees of Freedom (DOF) platform using six hydraulic cylinders. A motion simulator is basically a seat attached to such a platform. More than one seat can be set on the platform, for instance in "4D cinemas," 4 (or more) seats move together. A similar system designed for consumers is developed by D-Box. A seat is placed on 4 actuators which allow 3DOF: pitch, roll and heave, which provides a limited amplitude of movement. To provide larger amplitudes, the simulator can be mounted on rails or on a rotating surface. For example, a 401CR motion simulator is a 3 DOF simulator (roll, pitch, heave) mounted on a rotating platform, and its rotating movement (yaw) is potentially unlimited.

An intermediate device, which renders haptic effects between simple vibrations and complex motion, is the G-seat, which is designed to provide kinesthetic cues relative to a sensation of motion to a user. For instance, an upward movement is simulated by a pressure on the user's back. The stimulation of the kinesthetic system is generated by two mosaics of air cells to provide pressure on the thigh area, two clam-shell shaped air cells to provide pressure on the side of user's legs and a lap belt to provide ventral area pressure variation.

Haptic devices dedicated to video viewing, which may provide a wide range of haptic effects, have also been recently proposed. In one approach, a set of force-feedback devices, such as mobile armrests or headrests, are arranged around the seat so that they can apply forces to the user's body to generate a sensation of motion experiencing passive navigation. In the present application, a haptic device refers to any device that can provide haptic feedback, for example, as those defined in Table 1.

As shown in FIG. 1, at the rendering side, the audiovisual information can be reconstructed by an audiovisual renderer (131). The output is then sent to a display screen or one or more speaker (134) for playback.

In addition, the haptic effects can also be rendered by a haptic renderer 133. The output is then sent to a haptic device 135 to provide haptic effects. If the haptic effects are extracted from audiovisual media, an automatic extraction module (132) is used to process the output of the audiovisual renderer (131) to provide input to the haptic renderer (133). Thus, a user may have a more immersive experience by accessing both audiovisual effects and haptic effects.

Format Representation and Distribution (120)

Both the audiovisual media and the haptic effects can be encoded (121), stored in a container file (123) or transmitted through a network (122). The audiovisual media and the haptic effects can then be decoded (124) for rendering. The audiovisual media and haptic effects are decoded before being rendered. The transport protocols or audio/video compression standards provided by MPEG can be used in the workflow as shown in FIG. 1.

A media format defines the structure, including the data type and internal representation detail, for a type of media. While media formats for audiovisual content are well established, there is little work in addressing the haptic media format. Most existing approaches in defining haptic media formats rely on generic formats such as XML (Extensible Markup Language, a versatile description language), or a simple CSV (Comma Separated Values) format. For example, a sensory effect description language (SEDL) is based on XML, the MPEG-4 BIFS (Binary Format for Scenes) format is based on VRML/X3D (Virtual Reality Modeling Language, used to represent 3D worlds), and the latest MPEG-V standard is based on XML, which is specifically designed to provide multi-sensorial content associated with audio/video data, to control multimedia presentations and application by using advanced interaction devices.

The existing haptic formats suffer from some limitations or missing information, for instance it is unclear how to specify an effect in front of a user he can touch, or how to describe an effect coming to him, flying in front of him or contacting part of his body. As will be described below, we add the notion of the user skeleton and user space in which objects can be included. Knowing those objects and their position in the space, the positions of the user body parts, it is possible to know when an object contacts or applies pressure to the user, or describes an object displacement in the user space.

Figure 2:
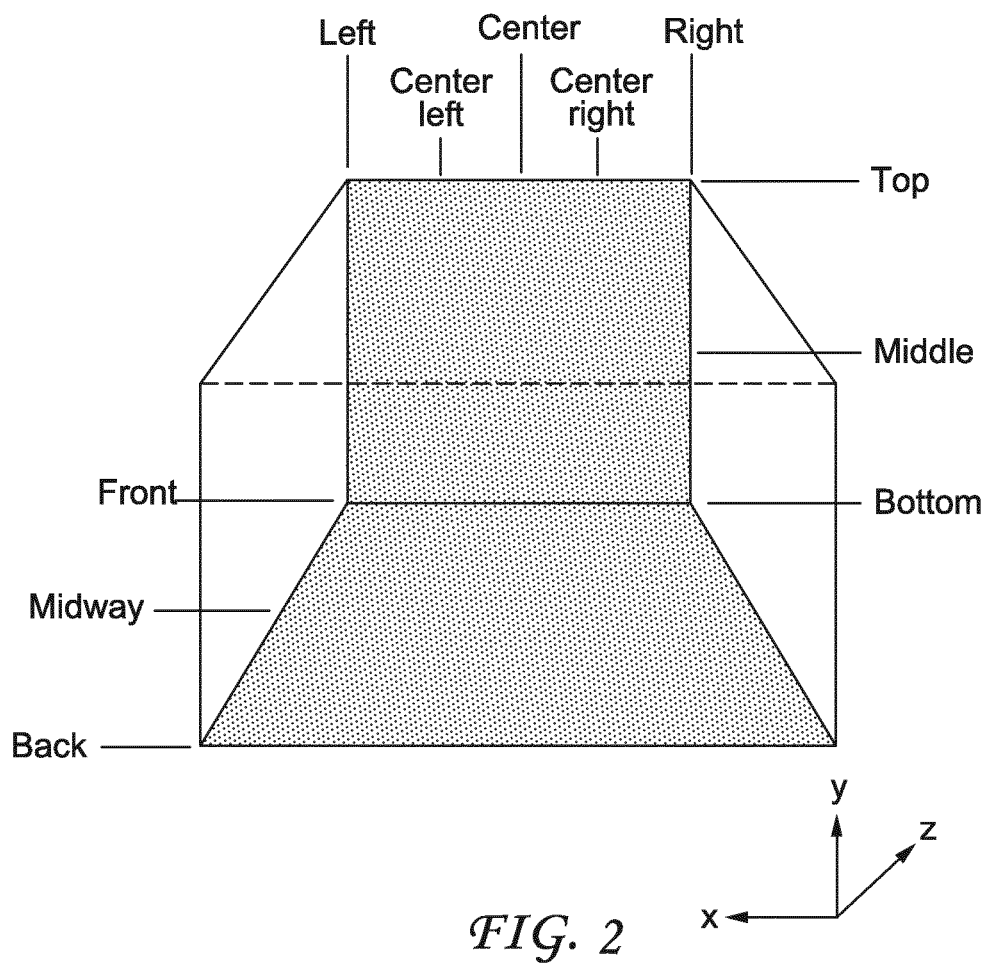
FIG. 2 illustrates a location model.

MPEG-V standard describe sensors and devices properties, as well as objects, haptic devices and effects. For example, as shown in Table 2, MPEG-V uses XML to specify the location where a vibration effect is expected to be received from the user's perspective according to the location model as illustrated in FIG. 2. In particular, this example shows the description of a Tactile effect using an audio tactile resource. The tactile effect is activated at si:pts="5" and the preferable tactile effect is vibration. The location is specified to be near the human heart region, on the front of the chest. The vibration effect is created based on a tactile resource which is an MP3 format audio file (i.e., heartbeat1.mp3), stored in the same parent location (URL) as the SEDL script itself. The duration and speed of the tactile effect are entirely derived from the duration and default speed of the audio file.

In the following, we use notations from MPEG-V and provides embodiments that complements the MPEG-V standard. It should be noted that the present principles can also be applied to other standards that relate to subject such as, but not limited to, virtual reality, immersive experiences, and haptic effects and processing.

TABLE 2

| 1 | <sedl:DescriptionMetadata> |
| --- | --- |
| 2 | <sedl:ClassificationSchemeAlias alias="TACTILEEFFECT" |
| 3 | href="urn:mpeg:mpeg-v:01-SI-TactileEffectCS-NS"/> |
| 4 | <sedl:ClassificationSchemeAlias alias="LCS" |
| 5 | href="urn:mpeg:mpeg-v:01-SI-LocationCS-NS"/> |
| 6 | </sedl:DescriptionMetadata> |
| 7 | <sedl:Effect xsi:type="sev:TactileType" tactileEffect=":TACTILEEFFECT:vibration" |
| 8 | si:pts="5" location=":LCS:centerleft:middle:front"> |
| 9 | <sev:TactileResource type="audio/mpeg" ref="heartbeat1.mp3"/> |
| 10 | </sedl:Effect> |

The description of the location according to MPEG-V does not allow a precise location of the objects and the user. There is no syntax in MPEG-V to specify the user in the MPEG-V location field. In addition there is no notion of user movements and body parts in the MPEG-V standard.

The present principles are directed to a method and an apparatus for providing haptic feedback and interactivity by introducing a notion of User Environment Space for Haptic Feedback and Interactivity (also referred to as a user haptic space or a HapSpace). In one embodiment, the user haptic space is specified through a defined user box including the space that is accessible to the user, for example, as a box encompassing what the user is able to access, or any space that is within the user's physical reach. The defined space includes the user, and may also include different haptic devices and haptic objects. A haptic object is a virtual object with associated haptic properties. In one example, when a user touches a haptic object, the user gets some vibrations and thus a sensation of touching the surface of the object. In another example, when a user has contact with a virtual musical instrument, a haptic device may also produce real-time sound and thus provides interactivity.

Figure 3:
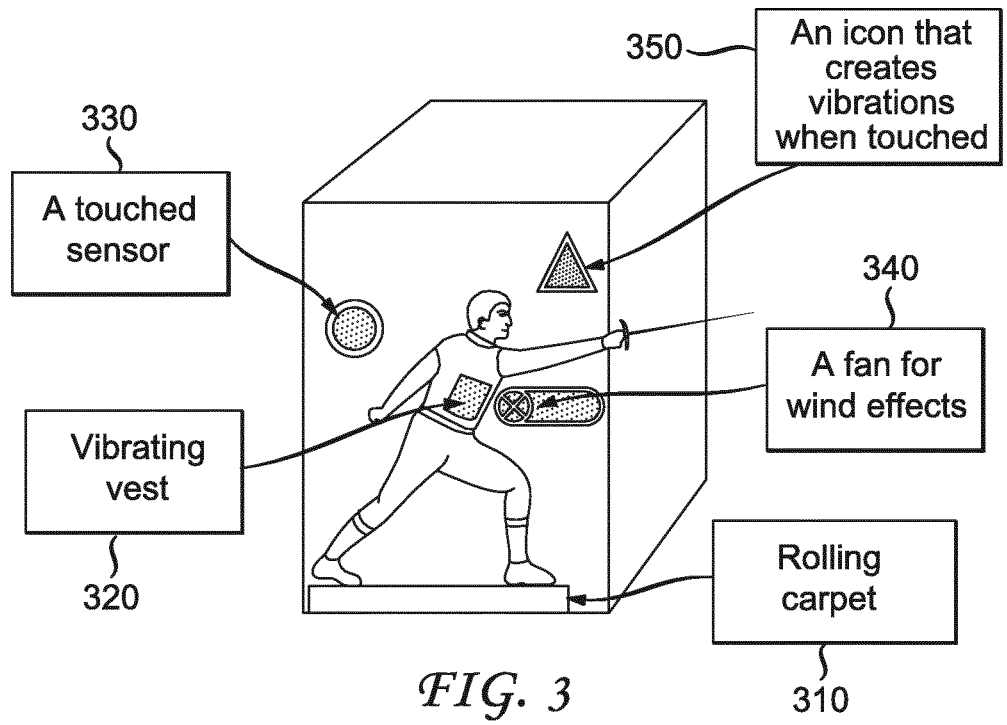
FIG. 3 illustrates an exemplary HapSpace, in accordance with an embodiment of the present principles.

FIG. 3 illustrates an exemplary HapSpace according to the present principles, wherein the HapSpace includes haptic rendering devices, haptic objects and a user playing a fencing game. The user can receive haptic feedback from several haptic devices, including a rolling carpet (310), a vibrating vest (320) and a fan (340). The user can also access several haptic objects, including a touched sensor (330) and an icon (350). More specifically, the rolling carpet (310) can provide a walking effect when the user moves, the vibrating vest (320) can provide a touch sensations effect when the user is contacted by another player, the touched sensor (330) can provide light when the user presses it, the fan (340) can provide a wind effect simulating an outdoor game, and the icon (350) can create vibration when it is touched. The fan can also be placed outside the HapSpace as long as the wind effect can reach the user. When a haptic device is outside the HapSpace, we may use an outside HapSpace code word to manage the presence of the haptic effect from the haptic device.

More generally, the HapSpace can be defined to provide a framework to specify objects, user and effects precisely. In one embodiment, the HapSpace can be represented by a cube with dimensions normalized to 1 (the box size is normalized between [0-1] in each axes (X, Y, Z)), and corresponding to a cube including the sphere drawn by the user's hand all around him at the maximal distance, the user being static. In general, the HapSpace can also be any 3-D space in any shape that includes anywhere the user can reach with any part of his body. The origin of the HapSpace can be the user's pelvis, another part of the user, a location around the user, for example, one foot right before the user, or any other location with reference to the user. By defining a HapSpace for a user, the user can also only transmit the haptic properties of haptic objects/devices within the space. Since the HapSpace is defined relatively to the user, if the user moves, the box moves with him. When there are multiple users, each user can define an individual HapSpace.

A haptic device or a haptic object can also be positioned in this space, for example, with the center of gravity or the geometric center located at coordinates (x,y,z) relative to the origin of the space. Typically in some applications such as gaming, a rough description of an object is not sufficient to provide interactivity. In one embodiment, to enable interactivity, we propose the message as shown in Table 3 to provide an accurate position for a user or any haptic device and haptic object in the HapSpace by using three Cartesian coordinates. In the following examples, we provide new descriptors using the notations of MPEG-V. These new descriptors can complement MPEG-V to more accurately describe a haptic space.

TABLE 3

| |
|---|
| <!-Relative Position Type --> |
| <simpleType name="RelativePositionType"> |
|     <restriction base="integer"> |
|         <minInclusive value="-1"/> |
|         <maxInclusive value="1"/> |
|     </restriction> |
| </simpleType> |
| <complexType name="Float3DPositionType"> |
|     <sequence> |
|         <element name="X" type="float"/> |
|         <element name="Y" type="float"/> |
|         <element name="Z" type="float"/> |
|     </sequence> |
| </complexType> |

In Table 3, we introduce two new descriptors: RelativePositionType and Float3DPositionType. Descriptor RelativePositionType specifies a position in the normalized HapSpace. Descriptor Float3DPositionType specifies the parameters of the RelativePositionType descriptor and may be useful in specifying the position in X, Y, Z with floating point representation (between 0 and 1).

Then the MPEG-V location field (for example, as shown in Table 2, line 8) can be replaced by a location="RelativePositionType" field such as location=": 0.01:0.983:0.134" as an example, wherein the three values represent the coordinate in the HapSpace, i.e., X=0.01, Y=0.983, Z=0.134.

In the proposed HapSpace, we can also link a haptic device or haptic object with the user. In one embodiment, we propose the message as shown in Table 4 to provide a link between the user and a haptic device/object.

TABLE 4

| |
|---|
| <!-Relative Linked Type --> |
| < simpleType name="BodyLinkType"> |
|     <element name="BodyPart" type="BodyPartType"/> |
| </simpleType > |

In Table 4, we introduce another new descriptor: BodyLinkType. Descriptor BodyLinkType specifies where a haptic device/object is on the user body with the parameter BodyPart. For instance a watch can be linked to the user's left wrist and we can describe it using location="LeftWrist."

Figure 4:
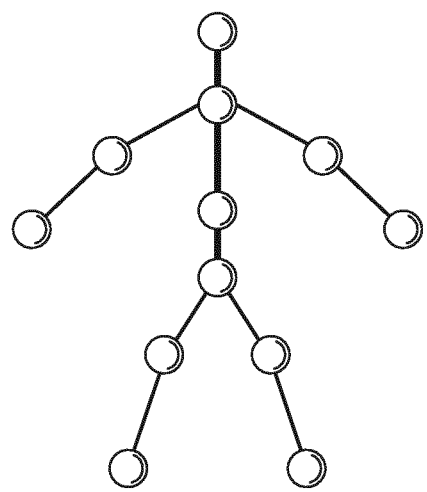
FIG. 4 illustrates body part positions.

The user's physical properties, for example, but not limited to, "armspan," height and weight, can be described using for instance the user's sensory preference specification of MPEG-V (part 2). To specify each body part position, we may use the Body model as illustrated in FIG. 4, which is described in a commonly owned patent application, entitled "Method and device for controlling a haptic device" by F. Danieau, J. Fleureau, P. Guillotel, and D. Doyen (EP14305823.8), the teachings of which are specifically incorporated herein by reference. In the present application, we further introduce new descriptors to describe the body part positions as shown in Table 5.

TABLE 5

| |
|---|
| <complexType name="BodyDescriptionType" abstract="true"> |
| <!-Body Description Type --> |
| <complexType name=" BodySegmentsType "> |
|     <sequence> |
|         <element name="SegNeck" type="float"/> |
|         <element name="SegForeamr" type="float"/> |
|         <element name="SegArm" type="float"/> |
|         <element name="SegJoints" type="float"/> |
|         <element name="SegTorso" type="float"/> |
|         <element name="SegLeftElbow" type="float"/> |
|         <element name="SegRightElbow" type="float"/> |
|         <element name="SegHead" type="float"/> |
|     </sequence> |
| </complexType> |
| <complexType name=" BodyPositionType "> |
|     <sequence> |
|         <element name="PosHead" type="RelativePositionType"/> |
|         <element name="PosNeck" type="RelativePositionType"/> |
|         <element name="PosLeftElbow" type="RelativePositionType"/> |
|         <element name="PosRightElbow" type="RelativePositionType"/> |
|         <element name="PosLeftHand" type="RelativePositionType"/> |
|         <element name="PosRightHand" type="RelativePositionType"/> |
|         <element name="PosNavel" type="RelativePositionType"/> |
|         <element name="PosPelvis" type="RelativePositionType"/> |
|         <element name="PosLeftKnee" type="RelativePositionType"/> |
|         <element name="PosRightKnee" type="RelativePositionType"/> |
|         <element name="PosLeftFoot" type="RelativePositionType"/> |
|         <element name="PosRightFoot" type="RelativePositionType"/> |
|     </sequence> |
| </complexType> |

Descriptor BodyDescriptionType describes positions of different user body parts in the defined user space. Each time when the user moves, a new location, for example, only the location of a moving part, needs to be sent.

Corresponding to the above body model, the haptic properties (i.e., the parameters of an haptic effect) can be defined by a MPEG-V message, such as the following one (Table 6) describing a kinesthetic effect.

TABLE 6

```
- <!-- ###################################################   -->
- <!-- SEV Passive Kinesthetic Motion type                   -->
- <!-- ###################################################   -->
-     <complexType name="PassiveKinestheticMotionType">
-         <complexContent>
-             <extension base="sev:RigidBodyMotionType"
  location="RelativePositionType">
-                 <attribute name="updateRate" type="positiveInteger"
  use="required"/>
-             </extension>
-         </complexContent>
-     </complexType>
```

Similarly, one can define the property of other haptic effects. For example, a VibrationSpecificationType descriptor can be defined to describe a vibration which may include two attributes: amplitude and frequency of the signal.

Assuming we know the user's "armspan," height and other physical parameters, the HapSpace size can be computed by the renderer, for example, with the value 1 being the armspan. Also, to create the defined haptic property, the renderer needs to track the user movements (using appropriate sensors such as a Kinect for instance).

A depth map (relative to the defined space) could be provided as an extension to provide a higher accurate map of where the objects are positioned. A depth map can be associated with each haptic device/object or user to describe the position in the space.

TABLE 7

```
- <!-Depth Map Type                            -->
- <simpleType name="DepthMapType">
-     <element name="Depth-x" type="unsigned8"/>
-     <element name="Depth-y" type="unsigned8"/>
-     <element name="DepthMap" type="DoubleMatrixType"/>
- </simpleType>
```

In Table 7, the (x,y) size of the depth map is specified by parameters Depth-x and Depth-y, wherein the depth map is relative to the HapSpace and we assume that the depth associated with a haptic device/object is the one at the closest spatial position to the depth map. A depth map provides an alternative in specifying the positions.

In the following, we assume that there is one user with a vibration ball in front of him, and the HapSpace is defined as the cube around him. We describe this scene in Table 8 using MPEG-V specification. It should be noted that this is a high level illustration of the concept. For an exact syntax the reader should refer to the MPEG-V specification. In particular, this example specifies that at location=": 0.01: 0.283:0.134" of the user, the vibration ball generates vibration at location=":0.51:0.983:0.8." The frequency and amplitude of the vibration vary over the time, as specified by (xn, an).

TABLE 8

```
-----------------------------------------
DECLARATION
user1 type Body
object1 type Vibration
location type RelativePositionType
specification type VibrationType
// specify the user's location to receive vibration.
// Here using a fixed position (right hand).
user1 location =":0.01:0.283:0.134"
// specify the object's location in the space
// (in front of, to the right of, and above the user)
```

TABLE 8-continued

```
object1 location = ":0.51:0.983:0.8"
object1 specification = range (frequency, amplitude)
EVENTS
for n=start to end {
    // makes the ball vibrate with frequency xt and
    // amplitude at Time t, Value (xt,at) for object1
    ...
    Time t+n, Value (xn,an) for object1
}
End.
```

In Table 9, we illustrate another example where the ball is linked to a body part (right hand), and the ball will generate vibration at the right hand at the frequency and amplitude specified by (xn, an).

TABLE 9

```
-----------------------------------------
DECLARATION
user1 type Body
object1 type Vibration //a ball for instance
specification type VibrationType
link type BodyLinkType
object1 specification = range (frequency, amplitude)
// specify the user's location to receive vibration.
// Here using a relative position (a part of the body, right
   hand).
object1 location = user1 RightHand
EVENTS
for n=start to end {
    // makes the ball vibrate with frequency xt and
    // amplitude at Time t, Value (xt,at) for object1
    ...
    Time t+n, Value (xn,an) for object1
}
End.
```

In Table 10, we illustrate an example of using the depth map to provide the position in the Z axis. For the example shown in Table 9, location=":0.01:0.283:0.134" of the user is now represented as location=":0.01:0.283:depth1 (201, 301)."

TABLE 10

```
-----------------------------------------
DECLARATION
object1 type Vibration
depth1 type DepthMapType
object1 specification = range (frequency, amplitude)
// specify the user's location (right hand) to receive vibration.
// Here using the position given by the depth map.
location type RelativePositionType
object1 location = ":0.01:0.283:depth1(201, 301)"
EVENTS
for n=start to end {
    // makes the ball vibrate with frequency xt and
    // amplitude at Time t, Value (xt,at) for object1
    ...
    Time t+n, Value (xn,an) for object1
}
End.
```

It should be noted that the descriptions in Tables 8-10 are for exemplary purposes only and the exact implementations may be different. For ease of notation, we denote the descriptions of the haptic properties as shown in Tables 8-10 as haptic descriptions or haptic effect descriptions. In general, the haptic descriptions can be for example, but not limited to, syntax structure, pseudo code, or software code describing the haptic properties.

Figure 5:
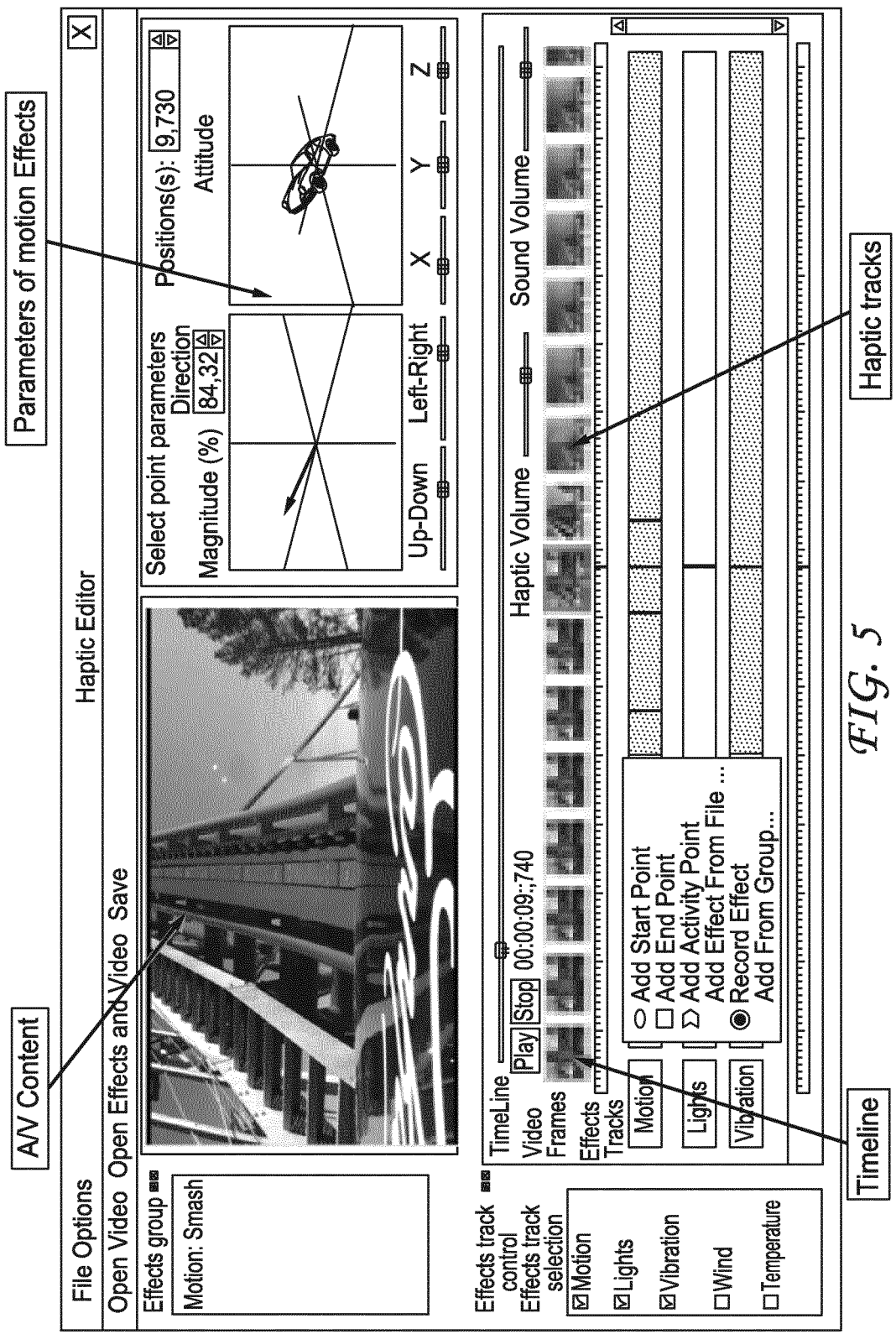
FIG. 5 illustrates an exemplary authoring tool (H-STUDIO).

The creation of the haptic descriptions can be done by an artist. The creation of the haptic effect can be performed using an haptic editing software with the necessary interface. An exemplary authoring tool, H-STUDIO, is illustrated in FIG. 5, wherein a motion effect is being edited. Particularly in FIG. 5, a motion direction (represented by an arrow) and orientation (represented by a car) are defined at time instant t. The authoring tool also allows the artist to generate a sequence of haptic properties (i.e., haptic tracks) in synchronization with the audiovisual content. Alternatively a motion unit can be used to capture characters' motion and insert the motion information within a haptic description.

The haptic description can be transmitted to a receiver after encapsulation in, for example, a mp4 file or a TS stream. The receiver includes an adaptation engine that decodes the haptic description and interpret the syntax so as to render the defined effects using different haptic feedback devices. We assume that there is a communication link that sends the appropriate signal to a haptic device to make it act as defined in the description. The haptic descriptions contained in the signal may be adapted based on the capability of the receiving haptic device. In one embodiment, the receiver knows the "capabilities" of each haptic device/object of the scene (range), and each rendering device includes an adaptation engine to convert the transmitted value to be within its own capabilities. For example, if the maximum frequency is 100 Hz and the receiver receive a command for rendering a 200 Hz vibration, the adaptation engine can decide to clip the frequency to 100 Hz.

For example shown in Table 8, a dedicated vibration signal can be transmitted for a ball in front of the user. If a player has access to a haptic device with a full capability of rendering, the ball is shown to the user and the vibration is applied where the user touched the ball. For another player who has access to a haptic device with a more limited rendering capability, for example, for a user has a simple smartphone device, the ball is not shown to the user and vibration of the ball is replaced by the vibration of the smartphone. More complicated scenarios could be defined to adapt to devices with various capabilities.

The present embodiments can be used to render haptic effects for a user, considering any kind of rendering device, for example, a seat, sensor, fan, piezo element, and speaker. Those haptic effects are linked to the audiovisual (movie) content but also to virtual objects that the user can interact with, for example, through user interfaces.

Figure 6:
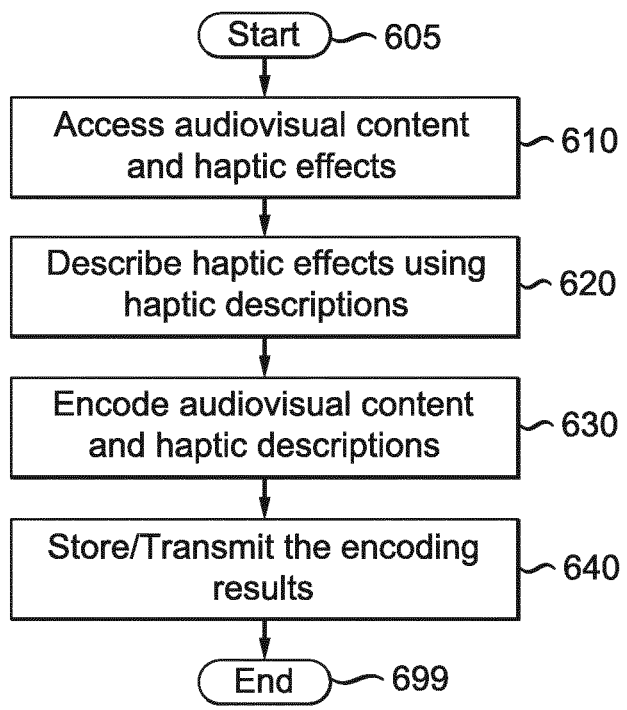
FIG. 6 illustrates an exemplary method for producing haptic effects along with audiovisual content, in accordance with an embodiment of the present principles.

FIG. 6 illustrates an exemplary method 600 for producing haptic effects along with the audiovisual content according to the present principles. Method 600 starts at step 605. At step 610, the audiovisual content and the haptic effects with the user's HapSpace are accessed as input. The haptic effects may be captured using sensors, extracted from the audiovisual content, or created by an artist. At step 620, the haptic effects can then be described using haptic descriptions as discussed above. The haptic effect descriptions are then encoded as well as the audiovisual content at step 630. The haptic effect descriptions may be encoded using, for example, but not limited to, a zip algorithm, MPEG BIFS binary format. The size of the HapSpace may also be indicated in the bitstream. The encoding results, i.e., the encoded bitstream, is then stored or transmitted at step 640. Method 600 ends at step 699.

Figure 7:
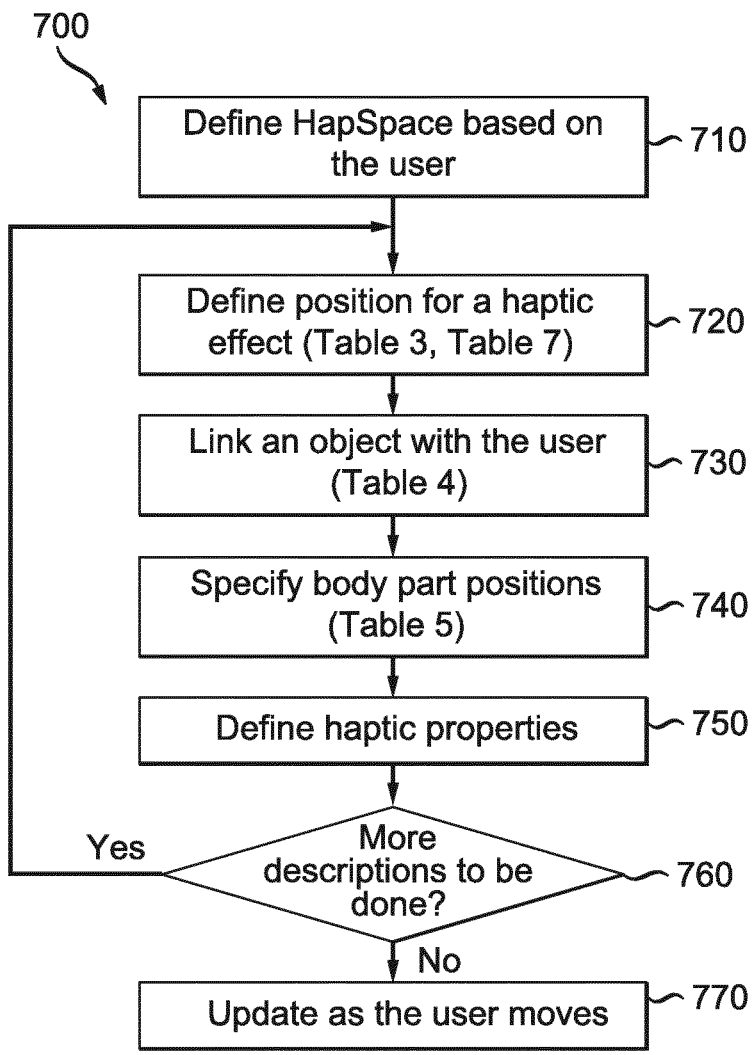
FIG. 7 illustrates an exemplary method for describing haptic effects within the HapSpace, in accordance with an embodiment of the present principles.

FIG. 7 illustrates an exemplary method 700 for describing haptic effects within the HapSpace according to the present principles. Method 700 can be used to perform step 620 in method 600. At step 710, the HapSpace is defined based on the user, for example, as a cube including what the user can reach. The properties of haptic effects and the locations of haptic effects within the HapSpace are then defined for the user, the haptic devices and haptic objects. For example, at step 720, an accurate position and/or a depth map of the position is defined, for example, using descriptors described in Table 3 and Table 7. At step 730, a haptic object/device may also be linked to the user, for example, using descriptors as described in Table 4. At step 740, the body part positions may be specified, for example, using descriptors as described in Table 5. The haptic properties for the haptic effects can be defined at step 750. At step 760, it checks whether more descriptions are needed. If yes, it returns the control to step 720. When the user' movement causes the origin of the HapSpace to move, the HapSpace can be updated at step 770.

The steps of method 700 can be performed in a different order from what is shown in FIG. 7. For example, steps 720-750 can be performed in any order. Also any one of steps 720-750 may or may not be implemented depending what haptic effects need to be described. Step 770 can also be skipped if the user does not move.

Figure 8:
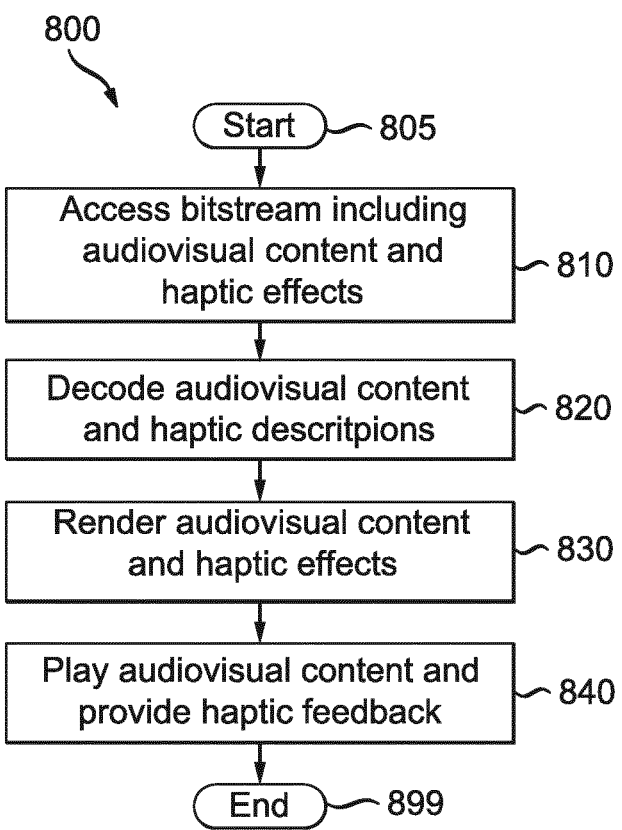
FIG. 8 illustrates an exemplary method for rendering haptic effects along with audiovisual content, in accordance with an embodiment of the present principles.

FIG. 8 illustrates an exemplary method 800 for rendering haptic effects along with audiovisual content according to the present principles. Method 800 starts at step 805. At step 810, a bitstream including the audiovisual content and the haptic effects are accessed as input. For example, the bitstream generated according to method 600 can be used as input. The bitstream may be organized into different tracks, some tracks for audio, some for video, some for haptics, all synchronized. Alternatively, the encoded haptic effects bitstream may be transmitted separately from the AV bitstream, and received by the receiver which synchronizes the bitstream and presentation.

At step 820, the audiovisual content and haptic effect descriptions are decoded. The decoded audiovisual content and haptic effect are then available for rendering at step 830. The rendering device should know how to derive the size of the HapSpace. For example, when the HapSpace is based on the arm length of a user, the rendering device should know how long is the arm and thus can derive the size of the HapSpace. Alternatively, the size of the HapSpace may be derived from the bitstream if the information is transmitted. At step 840, the audiovisual content may be provided for playback with the haptic feedback. For example, the audiovisual content can be sent to a display and a sound speak, and the haptic effects can be provided using haptic devices. Method 800 ends at step 899. The interpreted haptic effects can then be used for rendering.

Figure 9:
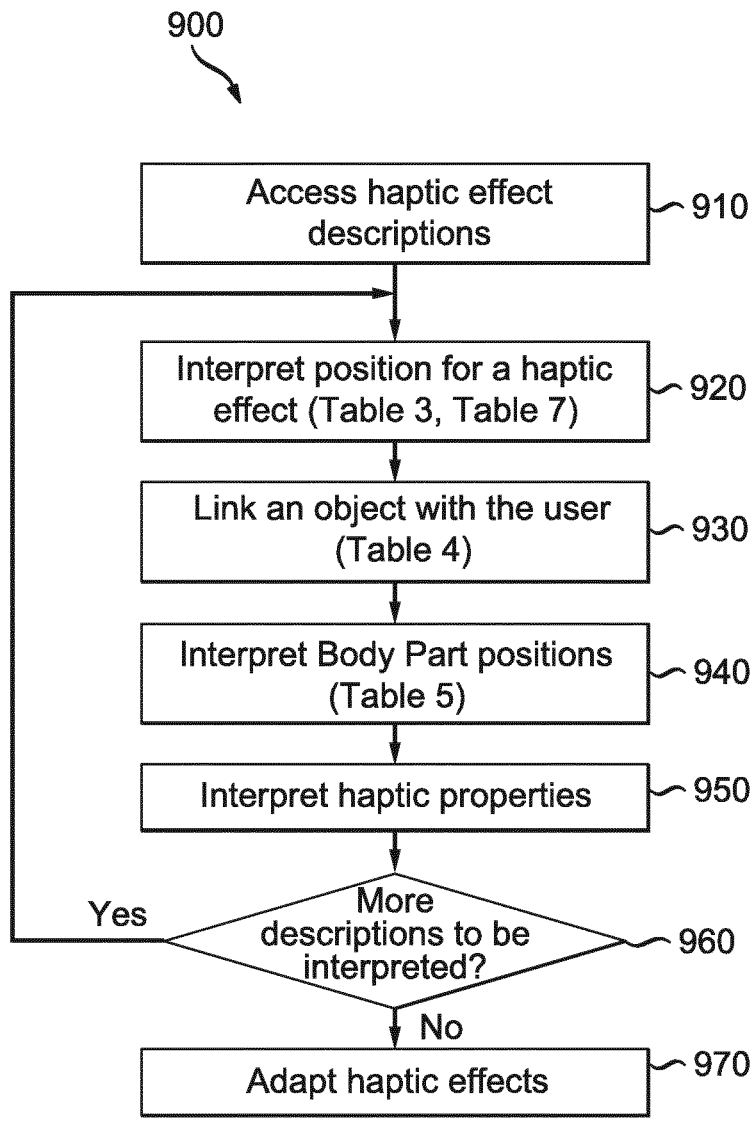
FIG. 9 illustrates an exemplary method for interpreting haptic effects within the HapSpace, in accordance with an embodiment of the present principles.

FIG. 9 illustrates an exemplary method 900 for interpreting haptic effects within the HapSpace according to the present principles. Method 900 can be used to perform step 830 in method 800. At step 910, the haptic effect descriptions are accessed. Then the haptic effects are interpreted. In particular, the position may be interpreted, for example, using descriptors described in Table 3 and Table 7. At step 930, a haptic object linked to the user may be interpreted, for example, using descriptors as described in Table 4. At step 940, the body part positions may be interpreted, for example, using descriptors as described in Table 5. The haptic properties for the haptic effects can be interpreted at step 950. At step 960, it checks whether more descriptions need to be interpreted. If yes, it returns the control to step 920. Depending on the capability of the rendering device, the haptic effect can also be adapted at step 970.

The steps of method 900 can be performed in a different order from what is shown in FIG. 9. For example, steps 920-950 can be performed in any order. Also any one of steps 920-950 may or may not be implemented depending what haptic effects need to be described. Step 970 can also be skipped if the haptic devices have full rendering capabilities.

Advantageously, the present embodiments provide a virtual space, namely, a user HapSpace attached to the user and may move with the user. The HapSpace also includes haptic objects that the user can access and haptic devices that can provide haptic effects to the user. The HapSpace is defined based on the user and is preferred to be defined as a space he can touch with his body. In the HapSpace, haptic objects can be defined with their haptic properties. In addition, the user and different haptic rendering devices can be accurately positioned in the HapSpace.

Figure 10:
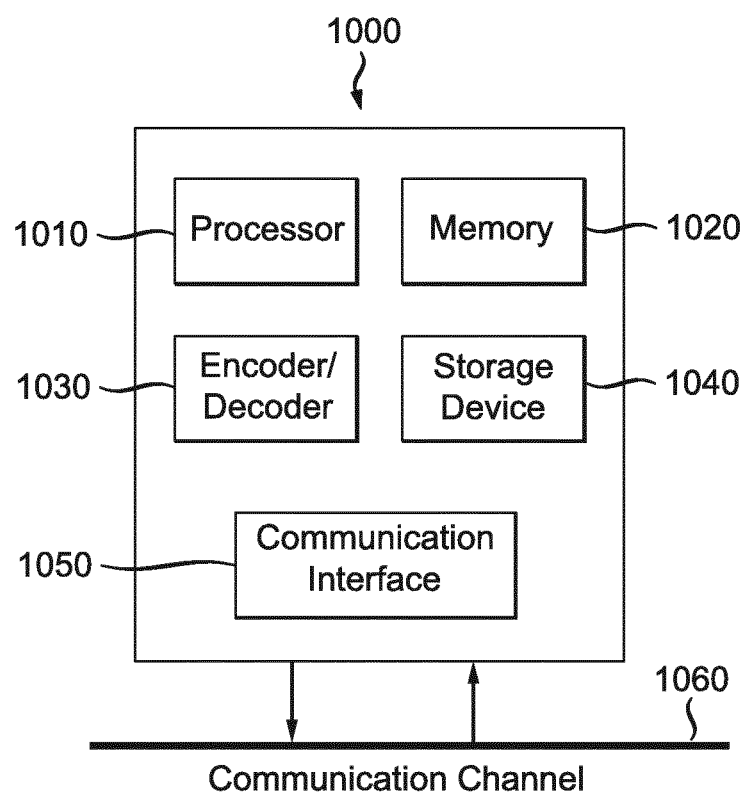
FIG. 10 illustrates a block diagram of an exemplary system in which various aspects of the exemplary embodiments of the present principles may be implemented.

FIG. 10 illustrates a block diagram of an exemplary system in which various aspects of the exemplary embodiments of the present principles may be implemented. System 1000 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 1000 may be communicatively coupled to other similar systems, and to a display via a communication channel as shown in FIG. 10 and as known by those skilled in the art to implement the exemplary video system described above.

The system 1000 may include at least one processor 1010 configured to execute instructions loaded therein for implementing the various processes as discussed above. Processor 1010 may include embedded memory, input output interface and various other circuitries as known in the art. The system 1000 may also include at least one memory 1020 (e.g., a volatile memory device, a non-volatile memory device). System 1000 may additionally include a storage device 1040, which may include non-volatile memory, including, but not limited to, EEPROM, ROM, PROM, RAM, DRAM, SRAM, flash, magnetic disk drive, and/or optical disk drive. The storage device 1040 may comprise an internal storage device, an attached storage device and/or a network accessible storage device, as non-limiting examples. System 1000 may also include an encoder/decoder module 1030 configured to process data to provide an encoded HAV content or decoded HAV content.

Encoder/decoder module 1030 represents the module(s) that may be included in a device to perform the encoding and/or decoding functions. As is known, a device may include one or both of the encoding and decoding modules. Additionally, encoder/decoder module 1030 may be implemented as a separate element of system 1000 or may be incorporated within processors 1010 as a combination of hardware and software as known to those skilled in the art.

Program code to be loaded onto processors 1010 to perform the various processes described hereinabove may be stored in storage device 1040 and subsequently loaded onto memory 1020 for execution by processors 1010. In accordance with the exemplary embodiments of the present principles, one or more of the processor(s) 1010, memory 1020, storage device 1040 and encoder/decoder module 1030 may store one or more of the various items during the performance of the processes discussed herein above, including, but not limited to the base layer input video, the enhancement layer input video, equations, formula, matrices, variables, operations, and operational logic.

The system 1000 may also include communication interface 1050 that enables communication with other devices via communication channel 1060. The communication interface 1050 may include, but is not limited to a transceiver configured to transmit and receive data from communication channel 1060. The communication interface may include, but is not limited to, a modem or network card and the communication channel may be implemented within a wired and/or wireless medium. The various components of system 1000 may be connected or communicatively coupled together using various suitable connections, including, but not limited to internal buses, wires, and printed circuit boards.

The exemplary embodiments according to the present principles may be carried out by computer software implemented by the processor 1010 or by hardware, or by a combination of hardware and software. As a non-limiting example, the exemplary embodiments according to the present principles may be implemented by one or more integrated circuits. The memory 1020 may be of any type appropriate to the technical environment and may be implemented using any appropriate data storage technology, such as optical memory devices, magnetic memory devices, semiconductor-based memory devices, fixed memory and removable memory, as non-limiting examples. The processor 1010 may be of any type appropriate to the technical environment, and may encompass one or more of microprocessors, general purpose computers, special purpose computers and processors based on a multi-core architecture, as non-limiting examples.

Figure 11:
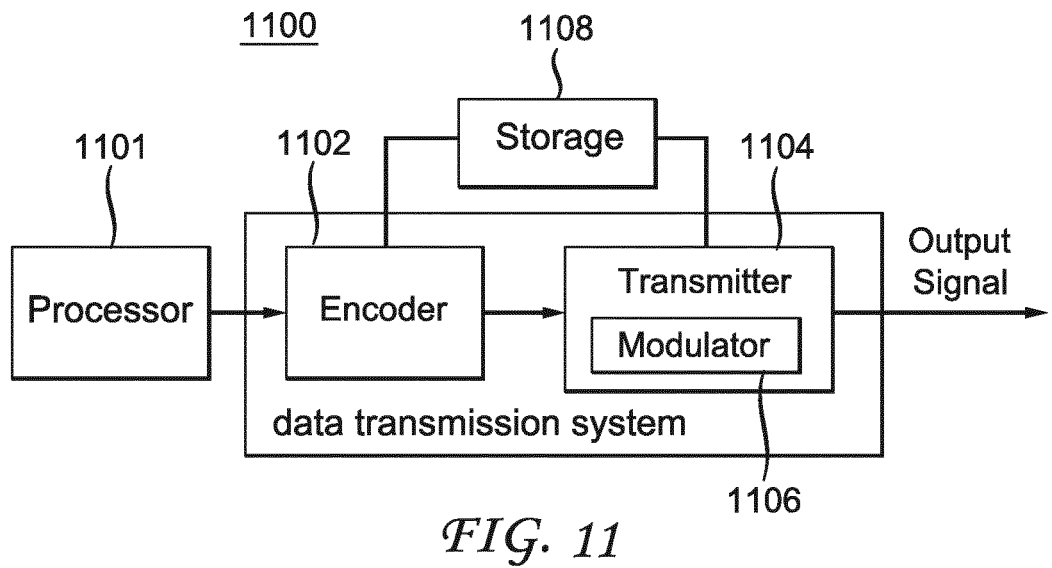
FIG. 11 illustrates a block diagram depicting an example of a video processing system that may be used with one or more implementations.

Referring to FIG. 11, a data transmission system 1100 is shown, to which the features and principles described above may be applied. The data transmission system 1100 may be, for example, a head-end or transmission system for transmitting a signal using any of a variety of media, such as, satellite, cable, telephone-line, or terrestrial broadcast. The data transmission system 1100 also may be used to provide a signal for storage. The transmission may be provided over the Internet or some other network. The data transmission system 1100 is capable of generating and delivering, for example, audiovisual content and haptic effects.

The data transmission system 1100 receives processed data and other information from a processor 1101. In one implementation, the processor 1101 generates captures haptic effects, extract haptic effects from an audiovisual content, or accepts haptic effects created by an artist. The processor 1101 may also provide metadata to 1100.

The data transmission system or apparatus 1100 includes an encoder 1102 and a transmitter 1104 capable of transmitting the encoded signal. The encoder 1102 receives data information from the processor 1101. The encoder 1102 generates an encoded signal(s).

The encoder 1102 may include sub-modules, including for example an assembly unit for receiving and assembling various pieces of information into a structured format for storage or transmission. The various pieces of information may include, for example, coded or uncoded video, and coded or uncoded elements. In some implementations, the encoder 1102 includes the processor 1101 and therefore performs the operations of the processor 1101.

The transmitter 1104 receives the encoded signal(s) from the encoder 1102 and transmits the encoded signal(s) in one or more output signals. The transmitter 1104 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 1106. The transmitter 1104 may include, or interface with, an antenna (not shown). Further, implementations of the transmitter 1104 may be limited to the modulator 1106.

The data transmission system 1100 is also communicatively coupled to a storage unit 1108. In one implementation, the storage unit 1108 is coupled to the encoder 1102, and stores an encoded bitstream from the encoder 1102. In another implementation, the storage unit 1108 is coupled to the transmitter 1104, and stores a bitstream from the transmitter 1104. The bitstream from the transmitter 1104 may include, for example, one or more encoded bitstreams that have been further processed by the transmitter 1104. The storage unit 1108 is, in different implementations, one or more of a standard DVD, a Blu-Ray disc, a hard drive, or some other storage device.

Figure 12:
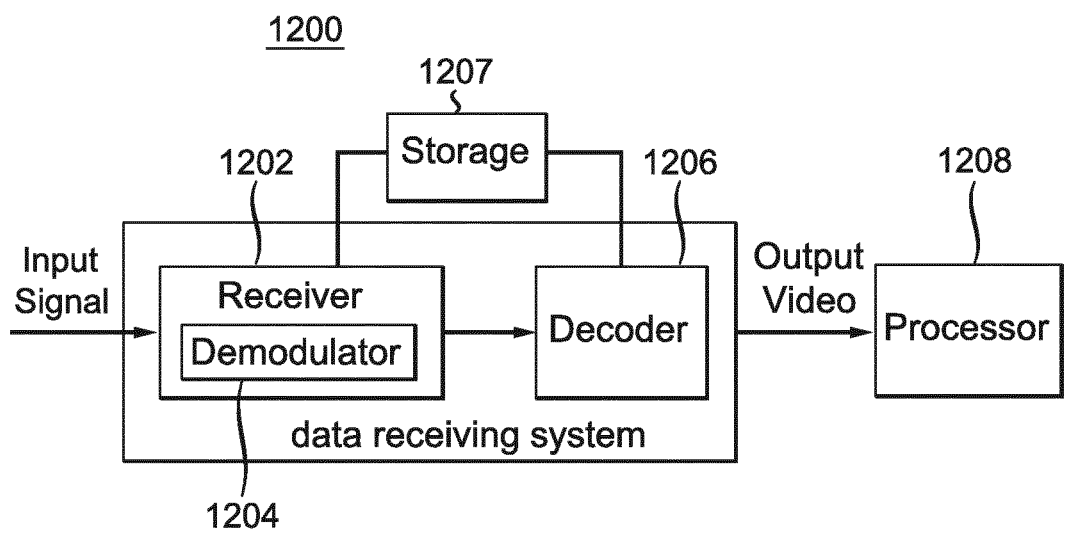
FIG. 12 illustrates a block diagram depicting another example of a video processing system that may be used with one or more implementations.

Referring to FIG. 12, a data receiving system 1200 is shown to which the features and principles described above may be applied. The data receiving system 1200 may be configured to receive signals over a variety of media, such as storage device, satellite, cable, telephone-line, or terrestrial broadcast. The signals may be received over the Internet or some other network.

The data receiving system 1200 may be, for example, a cell-phone, a computer, a set-top box, a television, or other device that receives encoded video and provides, for example, decoded video signal for display (display to a user, for example), for processing, or for storage. Thus, the data receiving system 1200 may provide its output to, for example, a screen of a television, a computer monitor, a computer (for storage, processing, or display), a G-seat, a vibration vest, or some other storage, processing, haptic or display device.

The data receiving system 1200 is capable of receiving and processing data information. The data receiving system or apparatus 1200 includes a receiver 1202 for receiving an encoded signal, such as, for example, the signals described in the implementations of this application. The receiver 1202 may receive, for example, a signal providing a bitstream, or a signal output from the data transmission system 1100 of FIG. 11.

The receiver 1202 may be, for example, adapted to receive a program signal having a plurality of bitstreams representing encoded audiovisual content and haptic effects. Typical receivers perform functions such as, for example, one or more of receiving a modulated and encoded data signal, demodulating the data signal from one or more carriers using a demodulator 1204, de-randomizing the energy in the signal, de-interleaving the data in the signal, and error-correction decoding the signal. The receiver 1202 may include, or interface with, an antenna (not shown). Implementations of the receiver 1202 may be limited to the demodulator 1204.

The data receiving system 1200 includes a decoder 1206. The receiver 1202 provides a received signal to the decoder 1206. The signal provided to the decoder 1206 by the receiver 1202 may include one or more encoded bitstreams. The decoder 1206 outputs a decoded signal, such as, for example, decoded video signals including video information, audio signal, and haptic effect descriptions.

The data receiving system or apparatus 1200 is also communicatively coupled to a storage unit 1207. In one implementation, the storage unit 1207 is coupled to the receiver 1202, and the receiver 1202 accesses a bitstream from the storage unit 1207. In another implementation, the storage unit 1207 is coupled to the decoder 1206, and the decoder 1206 accesses a bitstream from the storage unit 1207. The bitstream accessed from the storage unit 1207 includes, in different implementations, one or more encoded bitstreams. The storage unit 1207 is, in different implementations, one or more of a standard DVD, a Blu-Ray disc, a hard drive, or some other storage device.

The output data from the decoder 1206 is provided, in one implementation, to a processor 1208. The processor 1208 is, in one implementation, a processor configured for performing post-processing. In some implementations, the decoder 1206 includes the processor 1208 and therefore performs the operations of the processor 1208. In other implementations, the processor 1208 is part of a downstream device such as, for example, a set-top box or a television.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of transmitting a bitstream comprising data representative of haptic effect, the method comprising:
    encoding, into the bitstream, a first descriptor representative of a position in a user haptic space, the user haptic space represented by a cube with dimensions normalized in each of x, y, and z axis in a virtual environment, and having an origin with reference to a user, wherein the user haptic space is accessible to the user, wherein the user haptic space is bounded by a distance normalized to the user's physical reach, wherein the user haptic space provides for haptic feedback and interactivity, and wherein the user haptic space includes the user and moves with the user;
    encoding, into the bitstream, a second descriptor representative of a location of a virtual object having associated haptic properties relative to the user haptic space;
    encoding, into the bitstream, a third descriptor representative of a location of a haptic device in the user haptic space, the third descriptor representative of the location of the haptic device having a link type describing a location linked to the user; and
    transmitting the bitstream.

2. The method according to claim 1, wherein the second descriptor indicates a part of a body of the user onto which the virtual object is located.

3. The method according to claim 1, wherein the third descriptor indicates a part of a body of the user onto which the haptic device is located.

4. The method according to claim 1, wherein the first descriptor corresponds to first coordinates and the second descriptor corresponds to second coordinates.

5. The method according to claim 1, further comprising encoding a fourth descriptor representative of a position of at least one part of a body of the user at a determined time.

6. A non-transitory processor readable medium having stored therein instructions for causing a processor to perform at least the steps of the encoding method according to claim 1.

7. A method of decoding information representative of a haptic effect, the method comprising:
    receiving a bitstream;
    decoding from the bitstream a first descriptor representative of a position in a user haptic space, the user haptic space represented by a cube with dimensions normalized in each of x, y, and z axis in a virtual environment, and having an origin with reference to a user, wherein the user haptic space is accessible to the user, wherein the user haptic space is bounded by a distance normalized to the user's physical reach, wherein the user haptic space provides for haptic feedback and interactivity, wherein the user haptic space includes the user and moves with the user;
    decoding from the bitstream a second descriptor representative of a location of a virtual object having associated haptic properties relative to the user haptic space; and
    decoding from the bitstream a third descriptor representative of a location of a haptic device in the user haptic space, the third descriptor representative of the location of the haptic device having a link describing a location linked to the user.

8. The method according to claim 7, further comprising decoding a fourth descriptor representative of a position of at least one part of a body of the user at a determined time.

9. A non-transitory processor readable medium having stored therein instructions for causing a processor to perform at least the steps of the decoding method according to claim 3.

10. The method according to claim 7, wherein the second descriptor indicates a part of a body of the user onto which the virtual object is located.

11. The method according to claim 7, wherein the third descriptor indicates a part of a body of the user onto which the haptic device is located.

12. The method according to claim 7, wherein the first descriptor corresponds to first coordinates and the second descriptor corresponds to second coordinates.

13. A device configured to transmit a bitstream comprising data representative of haptic effect, the device comprising:
    an encoder configured to:
        encode, into the bitstream, a first descriptor representative of a position in a user haptic space, the user haptic space represented by a cube with dimensions normalized in each of x, y, and z axis in a virtual environment, and having an origin with reference to a user, wherein the user haptic space is accessible to the user, wherein the user haptic space is bounded by a distance normalized to the user's physical reach, wherein the user haptic space provides for haptic feedback and interactivity, and wherein the user haptic space includes the user and moves with the user;
        encode, into said the bitstream, a second descriptor representative of a location of a virtual object having associated haptic properties relative to the user haptic space;
        encode, into said the bitstream, a third descriptor representative of a location of a haptic device in the user haptic space, the third descriptor representative of the location of the haptic device having a link type describing a location linked to the user; and
    a transmitter transmitting said the bitstream.

14. The device according to claim 13, wherein the second descriptor indicates a part of a body of the user onto which the virtual object is located.

15. The device according to claim 13, wherein the third descriptor indicates a part of a body of the user onto which the haptic device is located.

16. The device according to claim 13, wherein the first descriptor corresponds to first coordinates and the second descriptor corresponds to second coordinates.

17. The device according to claim 13, wherein the encoder is further configured to encode a fourth descriptor representative of a position of at least one part of a body of the user at a determined time.

18. A device configured to decode information representative of a haptic effect, the device comprising:
- a receiver receiving a bitstream;
- a decoder configured to:
  - decode from said the bitstream a first descriptor representative of a position in a user haptic space, said the user haptic space represented by a cube with dimensions normalized in each of x, y, and z axis in a virtual environment, and having an origin with reference to the user, wherein the user haptic space is accessible to the user, wherein the user haptic space is bounded by a distance normalized to the user's physical reach, wherein the user haptic space provides for haptic feedback and interactivity, and wherein the user haptic space moves with the user;
  - decode from the bitstream a second descriptor representative of a location of a virtual object having associated haptic properties relative to the user haptic space; and
  - decode, from the bitstream, a third descriptor representative of a location of a haptic device in the user haptic space, the third descriptor representative of the location of the haptic device having a link type describing a location linked to the user.

19. The device according to claim 18, wherein the second descriptor indicates a part of a body of the user onto which the virtual object is located.

20. The device according to claim 18, wherein the third descriptor indicates a part of a body of the user onto which the haptic device is located.

21. The device according to claim 18, wherein the first descriptor corresponds to first coordinates and the second descriptor corresponds to second coordinates.

22. The device according to claim 18, wherein the decoder is further configured to decode a fourth descriptor representative of a position of at least one part of a body of the user at a determined time.

* * * * *

UNITED STATES PATENT AND TRADEMARK OFFICE
CERTIFICATE OF CORRECTION

Page 1 of 1

PATENT NO. : 11,964,200 B2
APPLICATION NO. : 15/742722
DATED : April 23, 2024
INVENTOR(S) : Philippe Guillotel et al.

It is certified that error appears in the above-identified patent and that said Letters Patent is hereby corrected as shown below:

In the Claims

Column 18, Line 23, Claim 9: "3.", should read "7."

Signed and Sealed this
Twenty-fourth Day of September, 2024

Katherine Kelly Vidal
*Director of the United States Patent and Trademark Office*